UNITED STATES PATENT OFFICE.

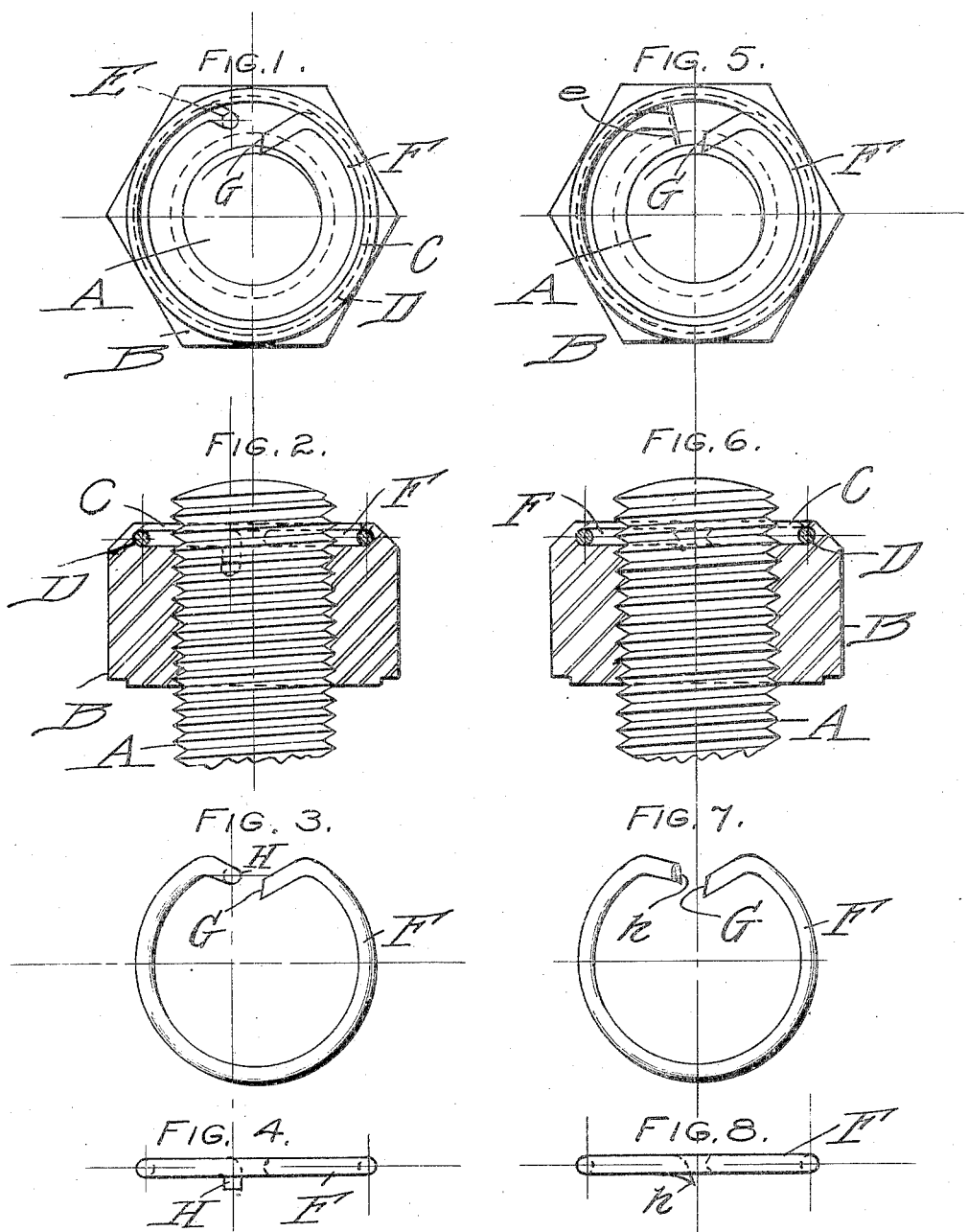

NAPOLEON R. THIBERT, OF WORCESTER, MASSACHUSETTS.

LOCK-NUT.

1,326,992.　　　　Specification of Letters Patent.　　Patented Jan. 6, 1920.

Application filed July 14, 1919. Serial No. 310,641.

*To all whom it may concern:*

Be it known that I, NAPOLEON R. THIBERT, a citizen of the United States, residing at Worcester, in the county of Worcester and State of Massachusetts, have invented a new and useful Lock-Nut, of which the following is a specification.

This invention relates to a lock-nut of the type involving a locking member in the form of a circular spring located in a recess in the nut and having an integral pawl on the end for engaging the thread of the bolt.

The principal objects of the invention are to provide a construction which will be extremely cheap to make by reason of the fact that the nut itself can be prepared for the reception of the spring in a most simple and inexpensive manner; to provide a spring which will be detachable and which will be of such a nature that there will be no probability of its being placed in position incorrectly; that is, so as to lock the nut against turning in the direction in which it is intended to turn; to provide a spring which although it needs to be placed in a certain position to secure the full locking effect, yet can be placed anywhere around the circle and will necessarily eventually come into locking position; and to provide a modification in which the nut is locked against turning in both directions; this modification being useful in certain cases where the creeping of the nut forwardly on the bolt would tend to bind some parts with which it is connected.

The invention also involves improvements in details as will appear.

Reference is to be had to the accompanying drawings in which—

Figure 1 is a plan view of one embodiment of this invention;

Fig. 2 is a sectional view of the same;

Fig. 3 is a plan of the locking spring;

Fig. 4 is a side view of the locking spring;

Fig. 5 is a plan of a slightly modified form of the invention;

Fig. 6 is a sectional view of the latter;

Fig. 7 is a plan of the locking spring thereof; and

Fig. 8 is a side view of the same locking spring.

Referring first to the first four figures, A designates the end of a bolt on which the locking nut B is screwed. The nut B is provided with a circular recess C in its top face, the bottom of said recess being undercut so as to leave a circular groove D. A longitudinal hole E is drilled a little ways into the nut at a convenient point within the recess C to provide a depression for anchoring the spring.

F designates a partial circular wire spring which is shaped to fit tightly in the groove D throughout its circular extent. One end of this spring is sharpened and bent inwardly to form an integral pawl G which will engage in the thread of the bolt. The other end H of the circular spring F is bent downwardly at right angles to the plane of the spring to provide a projection for entering the depression E to prevent the spring from rotating in the recess C.

In the form of the invention shown in Figs. 5, 6, 7 and 8 all the elements above mentioned are present, except that in place of the hole E I have provided a radial groove $e$ in the floor of the recess C and the end of the wire spring is sharpened to provide a pawl $h$, turned downwardly at right angles to the plane of the wire as is the case in Fig. 4. This modification is made for the purpose of cheapening the product as the depression $e$ can be made by means of a punching tool in a very rapid manner, and need not be located in any particular place circumferentially or radially so that there is no time lost in fitting the parts together or in gaging the exact position of this groove.

The use of the device is the same in both cases. The circular spring F is snapped in position in the groove D with its end projection H or $h$ in the hole E or the groove $e$. Or if the operator does not take pains to place the end in exactly the proper position the operation of the device will eventually bring it around so that it will snap into position. It is to be noted also that this projection H or $h$ is so noticeable that anybody with any mechanical experience at all would never place the spring in such position that it would project upwardly. He would know at once that it would have no utility in that position. Therefore it is practically foolproof because the user will always put the projection down into the bottom of the recess, and if he does that there is no danger of the spring being put in in a left-handed manner. As the spring fits tightly throughout its circular extent in the groove D it furnishes a strong backing for the pawl G all the way around.

In other words, any tendency which there may be for the pawl G to leave its seat in the screw-thread will be resisted by the spring throughout its length, and particularly at the point just opposite the pawl so it cannot give or jar loose.

When the parts are assembled in this manner the spring cannot rattle out of the nut and the nut can be handled as an article of commerce. But if desired the nuts and springs can be sold separately and the spring applied by the user on account of the fact that he will not be likely to get it in left-handed as stated above.

The nut is applied to the pawl in the ordinary way and screwed up to the desired position. If the spring is not yet in place it can be put in at this time. The pawl end G of the wire spring will slip around in the thread of the nut, but when the nut is in final adjusted position the pawl will engage tightly in the thread and lock the nut in its place, preventing any rotation of the nut tending to unscrew it from the bolt. This action particularly will take place as the partial circular wire spring fits tightly in the groove throughout its circular extent and there can be no backlash between the spring and the nut. In practice it has been found that vibration will tend to tighten the lock nut on the screw.

It is to be noted that the spring seats in the undercut groove D and tends to expand outwardly against the deepest surface thereof so that it will not become detached even when the nut is not on the screw. Furthermore as the end H or h does not project beyond the circle the spring can be removed by inserting a sharp instrument and prying up this end first. This is particularly so in the case shown in Figs. 5 to 8.

Although I have illustrated and described only certain forms of the invention I am aware of the fact that other modifications can be made therein by any person skilled in the art without departing from the scope of my invention as expressed in the claims. Therefore I do not wish to be limited to all the details of construction herein shown and described, but what I do claim is:—

1. A non-reversible lock nut comprising a screw-threaded nut having a circular grooved recess in one face, a depression located in the bottom of said recess at a distance below the end or face of the nut, a circular wire spring fitting tightly in the groove throughout substantially the whole of its length, one end of said spring having an inwardly extending pawl for engagement with the thread on the bolt, and the other end being bent downwardly at a point near said inwardly engaging pawl for engaging in said depression.

2. A non-reversible lock nut comprising a screw-threaded nut having a circular grooved recess therein, a partial circular wire spring located in a plane, and fitting tightly in the groove substantially throughout its circular extent, one end of said spring engaging in the thread on the bolt, and the other end being located near said thread engaging end and being bent downwardly at substantially right angles to the plane of said spring, the recess being provided with a depression in its bottom surface, for receiving the last named bent end to prevent rotation of the spring in the recess.

3. A lock nut comprising a screw-threaded nut having a circular grooved recess therein and a radial groove in the face of said recess, a partial circular wire spring fitting tightly in the recess, one end of said spring being sharpened and bent inwardly for pawl-like engagement in the thread of the bolt, the other end being bent inwardly and then downwardly at an angle to the plane of the spring at a point near the center of said recess and sharpened for engagement at any point along said groove.

4. A lock nut comprising a screw-threaded nut having a circular grooved recess therein and a groove extending across the face of said recess, a circular wire spring in the recess, one end of said spring being bent inwardly for pawl-like engagement in the thread of the bolt, the other end being bent downwardly and sharpened for engagement in said groove.

In testimony whereof I have hereunto affixed my signature.

NAPOLEON R. THIBERT.